J. TAYLOR.
MOTOR TRUCK.
APPLICATION FILED AUG. 13, 1909.

950,267.

Patented Feb. 22, 1910.

Inventor:
John Taylor

Witnesses

By Alexander & Dowell
Attorneys

J. TAYLOR.
MOTOR TRUCK.
APPLICATION FILED AUG. 13, 1909.

950,267.

Patented Feb. 22, 1910.
6 SHEETS—SHEET 3.

Inventor:
John Taylor

Witnesses

By
Attorneys

J. TAYLOR.
MOTOR TRUCK.
APPLICATION FILED AUG. 13, 1909.

950,267.

Patented Feb. 22, 1910.
6 SHEETS—SHEET 6.

Inventor:
John Taylor

UNITED STATES PATENT OFFICE.

JOHN TAYLOR, OF COLONIE, NEW YORK, ASSIGNOR TO TAYLOR ELECTRIC TRUCK CO., OF TROY, NEW YORK, A CORPORATION OF NEW YORK.

MOTOR-TRUCK.

950,267.  Specification of Letters Patent.  Patented Feb. 22, 1910.

Application filed August 13, 1909. Serial No. 512,730.

*To all whom it may concern:*

Be it known that I, JOHN TAYLOR, of Colonie, in the county of Albany and State of New York, have invented certain new and useful Improvements in Motor-Trucks; and I hereby declare that the following is a full, clear, and exact description thereof, reference being had to the accompanying drawings, which form part of this specification.

This invention is an improvement in car trucks, and its principal object is to produce a car truck especially adapted for use in connection with gasolene or like explosive motors by which such truck is to be propelled; and the invention is embodied in a truck adapted for carrying motors of this character and to be propelled thereby, and such truck is hereinafter fully described and has been successfully used in connection with such motors.

One object of the invention is to fixedly support the motor firmly on the truck frame, independently of the car body so that the motor is carried entirely by the truck frame, while the body is independently supported on the truck frame and is free to move on its carrying springs,—while the motor has a spring suspension through the truck frame on the car axles.

Another object is to provide means whereby the car axles may be adjusted laterally so as to regulate the tension on the chains or belts transmitting motion from the motor shaft to the axles, without taking down any parts of the truck or motor frame.

The invention embodies various novel features of construction of the truck frame whereby it is particularly adapted for use as a motor truck, as stated, and which features will be hereinafter explained in detail in connection with the accompanying drawings which illustrate the present preferred form of truck, and various modifications thereof within the scope of the invention.

I will now describe the truck with reference to the said drawings, and set forth in the claims the novel features of construction and combinations of parts embodying the invention and for which protection is desired.

In said drawings Fig. 8 is an enlarged vertical sectional elevation through one of the pedestals on the line 8—8, Fig. 3. Fig. 9 is a transverse section on line 9—9, Fig. 8. Fig. 9$^a$ is a detail section illustrating the M. C. B. type of journal bearing. Fig. 10 is a horizontal section on line 10—10, Fig. 8. Fig. 11 is a reduced section through the pedestal on line 11—11, Fig. 8. Fig. 11$^a$ is an inside face view of one member of the two-part pedestal. Fig. 12 is a detail view showing the spring swinging shackle and its support.

The truck in general design is similar to the trucks shown in my Patents #437,167 of September 23, 1890; #471,912 of March 29, 1892; and #598,449 of February 1, 1898; and comprises parallel side members each composed of parallel upper bars 1, 1$^a$, which are rigidly united by suitable bolts 1$^b$ separated between the pedestals by bracket castings 1$^c$, and at their ends by castings 1$^d$ to which the end bars of the frame are rigidly united. To these side frames are secured the pedestals or jaws 4, 4, the adjacent pedestals on same side of truck being connected at bottom by stay bars 4$^n$ which are also connected to castings 1$^c$; and braces 4$^p$ are interposed between the outer legs of such pedestals and the castings 1$^d$ as shown. Each end member of the frame as shown in Figs. 1 to 4, is preferably formed of a metal bar 2 laid flatwise, and having its ends rigidly fastened to the castings 1$^d$; and said bar 2 is bent centrally downward as at 2$^a$ for a purpose hereinafter explained. The bar 2 is strengthened by truss-rods $2^c$ (Figs. 4 and 5) which are securely bolted to the castings $1^d$ by nuts $2^d$, (see Fig. 4,) and strut castings $2^e$ are interposed between the truss-rods $2^c$ and the bar 2 as shown, so as to support the bar on the truss-rods. This forms a very stiff and substantial end member of the frame.

The bar 2 is preferably made of wrought steel and is dropped or bent downward at center, as shown at $2^a$, to accommodate the frame or casing of the gasolene engine, or motor transmission case. On this bar 2 at opposite sides of the bend $2^a$ are mounted cheek-brackets $2^f$ on which are supported angle-iron beams $2^g$, said beams extending parallel and longitudinally of the truck-frame; and upon and between these beams is suspended the motor M as indicated in dotted lines in Figs. 1 to 3. In this way the motor can be rigidly and firmly mounted upon the truck-frame independently of the car body. The angle bars $2^g$ extend a little more than full length of the truck-frame to support both the engine and the transmission case, and the bend $2^a$ in the end member allows it to pass under the engine frame or casing.

Figure 4:
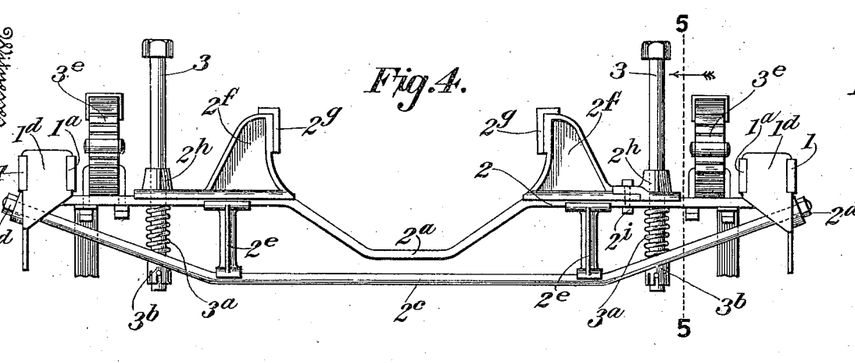
Fig. 4 is an enlarged detail end elevation of the truck showing the preferred form of end bar.
Figure 5:
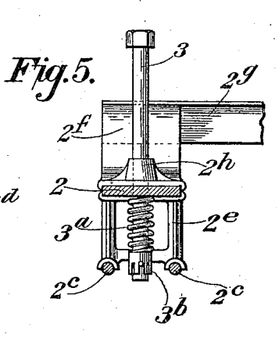
Fig. 5 is a section on line 5—5, Fig. 4.

Through the end members pass king bolts 3, of which four are preferably used, two on each end member and at the outer sides of the cheek brackets. As shown in Fig. 4 these king bolts are guided in casings $2^h$ secured to bar 2 as shown; and springs $3^a$ are interposed between the under side of the bar 2 and washers or collars $3^b$ pinned on the lower end of the angle beam as shown. The guides $2^h$ might be made integral with the cheek brackets $2^f$ as indicated at the left-hand side of Fig. 4, but are preferably made separable therefrom and secured thereto and to the bar 2 by bolts $2^i$, as indicated at the right-hand side of Fig. 4, so that in case of derailment of the truck or breaking of the guide $2^h$ it would not be necessary to supply entirely new cheek-brackets.

On the end members between the king bolts 3, and the side members of the truck-frame, are placed the body carrying springs $3^e$, which are preferably full elliptic springs, and four or more of such springs are employed. The sills 9 of the car body rest upon these springs and the king bolts 3 secure the car body thereupon, see Figs. 1 and 2.

The weight and strain of the engine is directly transmitted to the end members of the truck-frame through the angle beams $2^g$, and the weight of the car body and its load is also transmitted to these end members through the springs $3^e$. The end members as shown in Figs. 1–4, are so strongly trussed that they are amply able to sustain any load to which they are subjected.

Figures 8, 9, 9A, 10, 11, 11A, 12:
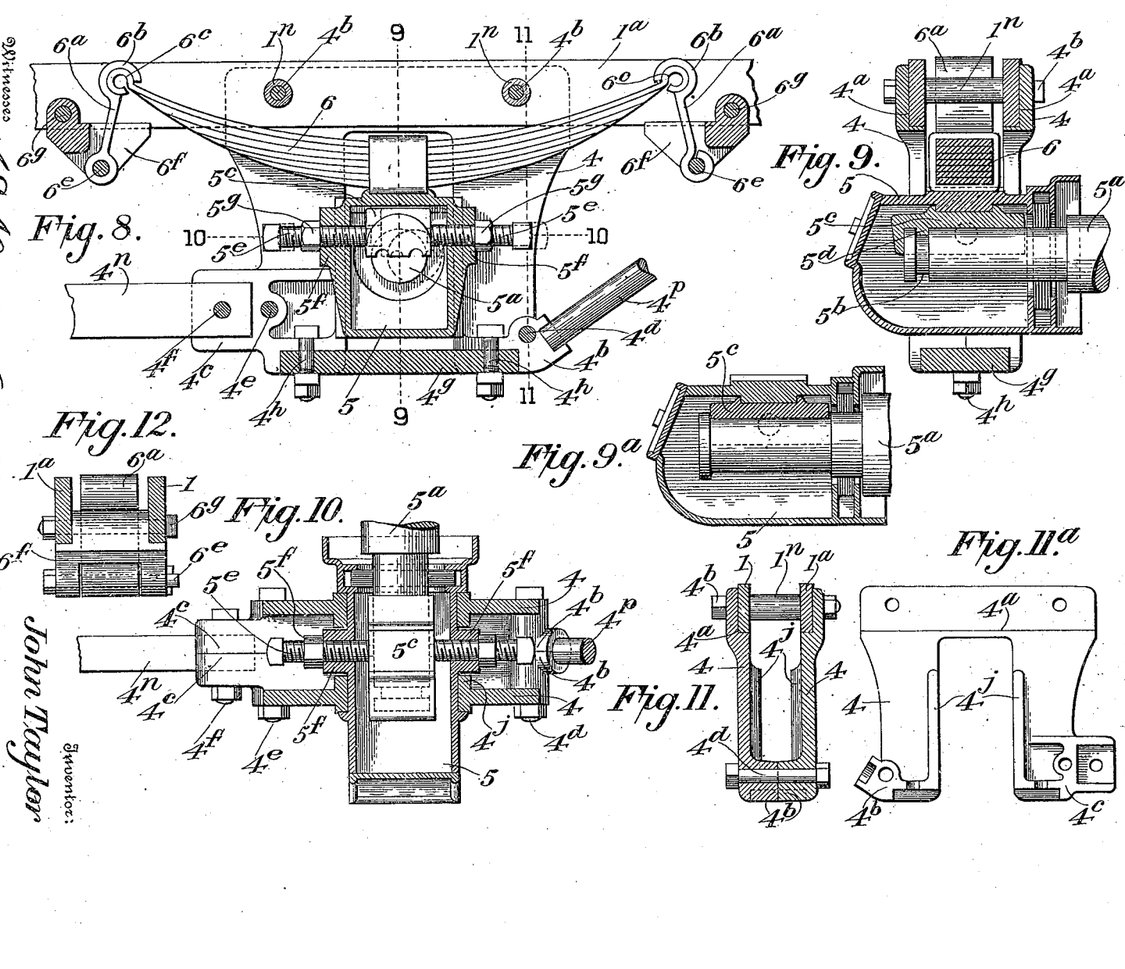

The pedestals 4 are preferably constructed, as indicated in Figs. 8 to 11, of opposite complemental halves, which are rabbeted as at $4^a$ to fit against and under the bars 1, $1^a$, and are firmly secured thereto by means of bolts $4^b$ passing through said bars and sleeves $1^n$ interposed between the bars, see Figs. 8 to 11. The lower ends of the pedestal halves are provided with abutting inwardly projecting portions $4^b$, $4^c$, (see Fig. $11^a$,) which abut closely together and are securely united by means of bolts $4^d$, $4^e$, $4^f$, (see Figs. 8 to 11.) The bolts $4^f$ also transfix the bottom stay bars $4^n$, which are interposed between the adjacent pedestal 4 as indicated in Figs. 1 and 8.

Figure 1:
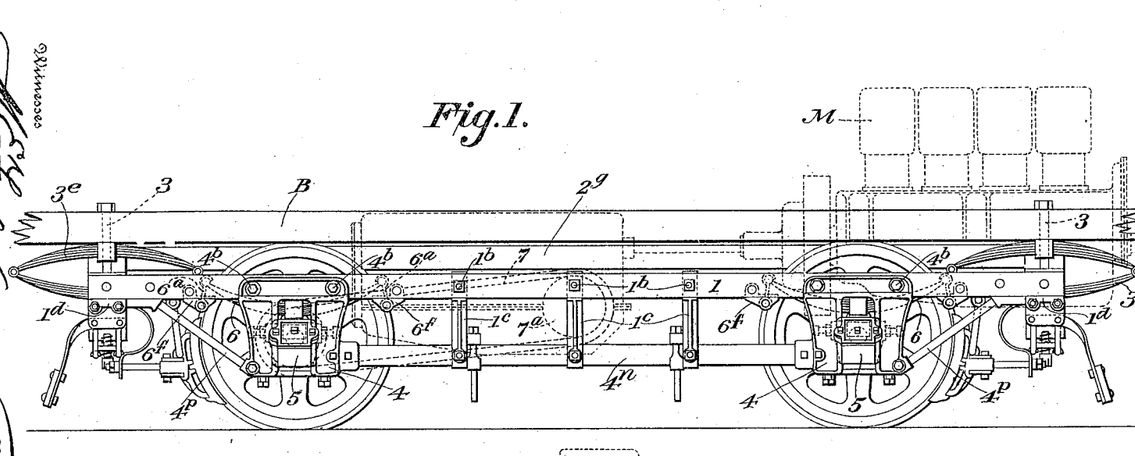
—Figure 1 is a side elevation of my motor truck and indicating the motor in dotted lines.

The journal boxes 5 are confined between the legs of the pedestals in the usual manner, and are capable of vertical movement therein, said boxes being of usual construction, and the lower end of the pedestals being closed by the usual tie-plates $4^g$ secured thereto by bolts $4^h$, (see Figs. 1, 8 and 9.)

The boxes 5 are supported on the journals $5^a$ of the car axles as usual and any suitable type of axle journal may be employed. The journal shown in Fig. 9 has an annular groove $5^b$ in its end, and the bearing plate or brass casting $5^c$ interposed between the top of the box and the journal bearing, has a flange $5^d$ on its outer end to engage the grooved part $5^b$ of the journal, see Figs. 8, 9, 10; or the regular M. C. B. type of journal can be used, as indicated in Fig. $9^a$. The bearing-plate $5^c$ is preferably made laterally adjustable in the box 5, to adjust the axles laterally; and for this purpose I preferably use opposite adjusting bolts $5^e$ tapped through bosses $5^f$, on the sides of the journal box, and provided with locking nuts $5^g$, see Figs. 8, 9, 10. By adjusting the bolts $5^e$ the bearing plate $5^c$ can be moved laterally in the box 5, so as to adjust the axle journal $5^a$ laterally, and thus take up wear or slack in the sprocket or driving chains or belts connecting the axles to the motor.

In the practical construction of the boxes I have provided for a lateral adjustment of one-and-one-half inches of each plate $5^c$ in the box, which would make a total possible adjustment between the front and rear axles of three inches, which I find is sufficient for practical purposes, and does not make the journal boxes too bulky or large. With such adjusting devices all the working parts are covered and not exposed to grit, mud or slush of the road bed, and either type of journal-bearing shown in Figs. 9 or $9^a$ can be employed.

By making the pedestal in two parts I simplify casting it and facilitate inserting the journal boxes therein; and the box is prevented from lateral play in the pedestal and is given sufficient wearing surface by means of the ribs $4^j$ on the inner edges of the legs of the pedestal as shown. The outer leg of the pedestal is braced by means of the truss-rods 4ᵖ which are secured to sockets in the enlargements 4ᵇ of the pedestal castings, and in suitable sockets in the castings 1ᵈ at the corners of the truck-frame, as indicated in Figs. 1 and 3.

The truck-frame is hung upon the journal box 5 by suitable springs; I preferably employ the stout semi-elliptic springs 6 shown in Figs. 1 and 8, which springs are centrally supported on the top of the box 5, and their ends are connected to the truck-frame between the bars 1, 1ᵃ, by means of novel shackles 6ᵃ. These shackles are provided with hooks 6ᵇ on their upper ends that embrace and engage the eyes 6ᶜ on the end of the springs 6, and are engaged with the eyes 6ᶜ by slipping the hooks 6ᵇ laterally over the eyes 6ᶜ which can only be disengaged from the hooks by reversely drawing the hooks laterally from the eyes. The shackles are preferably made as wide as the springs thus giving a broad area of wearing surface and increasing the life of the shackles very greatly. The bottom ends of the shackles are pivoted on pins 6ᵉ attached to brackets 6ᶠ fastened beneath and between the bars 1 and 1ᵃ by means of bolts 6ᵍ, see Figs. 1, 8 and 12. The eyes on the lower end of the shackles are preferably made by bending them, as indicated at the right-hand side of Fig. 8, but may be made by boring or forging its end as indicated at the left-hand side of Fig. 8. The pins 6ᵉ are preferably secured by a cotter as indicated in Fig. 12. It will be seen that the truck-frame with the motor and the car body is suspended upon the axles by semi-elliptical springs 6 so that the motor has a cushion or spring suspension on the axles, but the body supporting springs are not subjected to any strain of carrying the motor.

Figure 3:
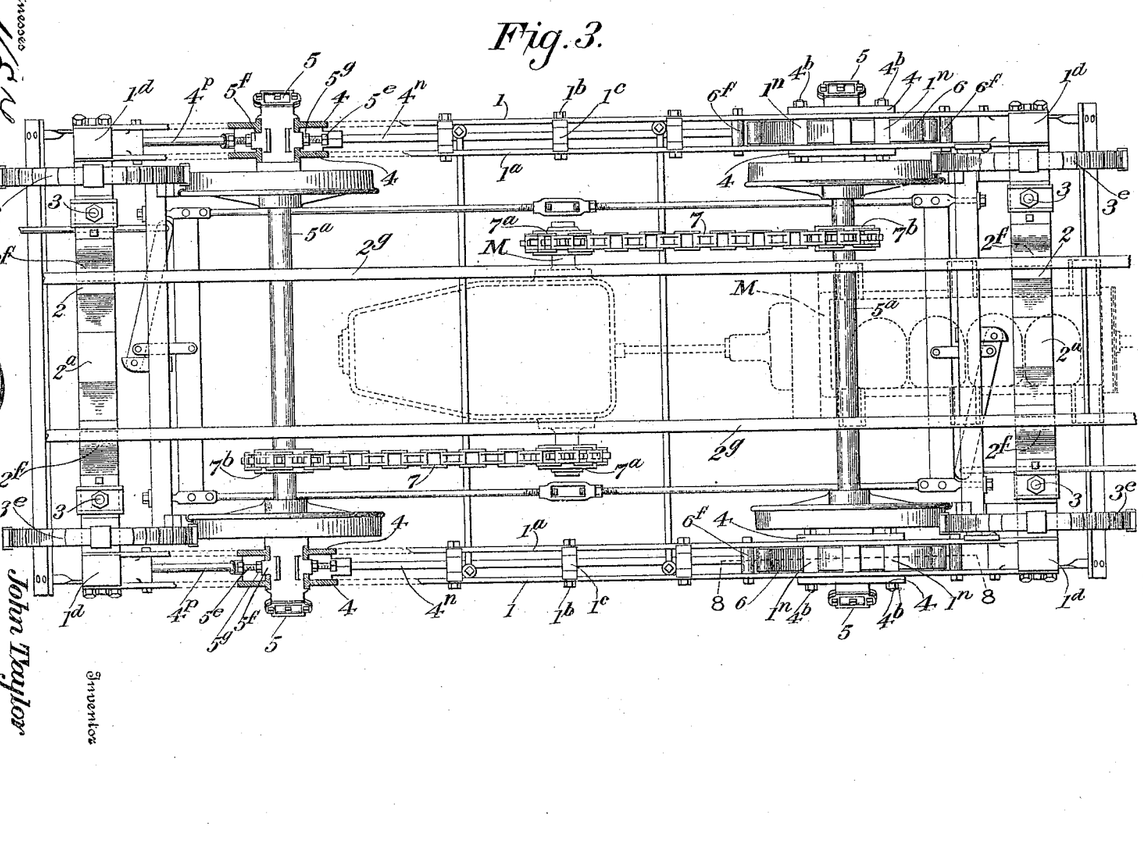
Fig. 3 is a top plan view of Fig. 1, with some parts in section.

The motor may be of any suitable construction and preferably is an explosive engine and motion is transmitted direct from the motor driven shaft M to the axles by means of sprocket chains 7, see Fig. 3, running over sprocket wheels 7ᵃ on the motor shaft and wheels 7ᵇ keyed to the axle. As shown the chain driving the forward axle is at one side of the motor and that driving the rear axle is arranged at the other side of the motor, but this arrangement of chains may be varied.

Figure 6:
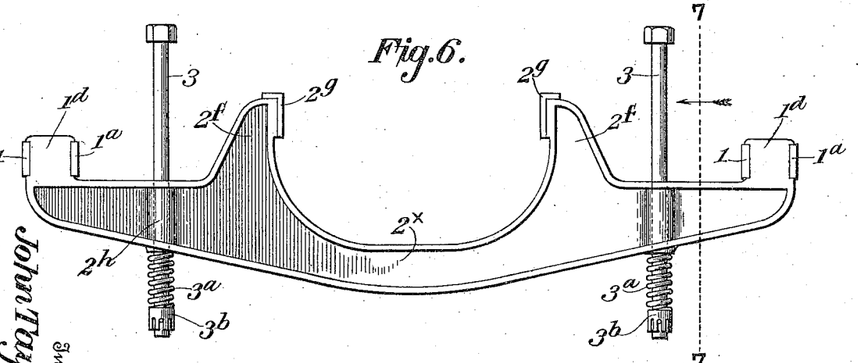
Fig. 6 illustrates a modified form of the end bar.
Figure 7:
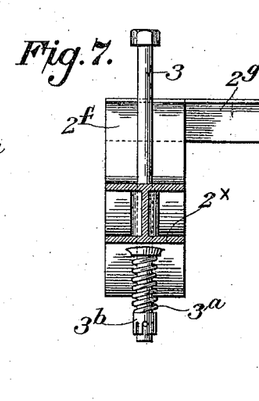
Fig. 7 is a section on line 7—7, Fig. 6.
Figure 15:
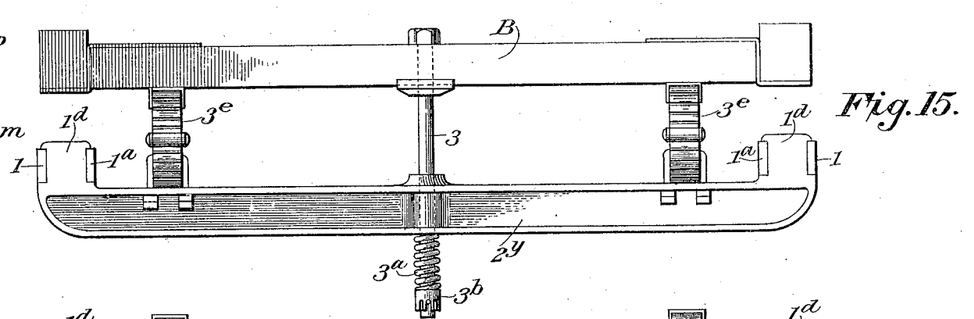
Fig. 15 is an end view of the truck with another modified form of end bar.
Figure 16:
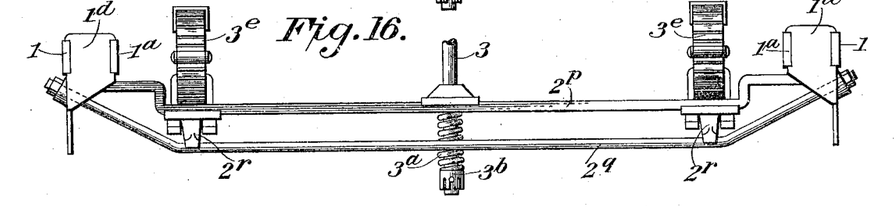
Fig. 16 illustrates another modification of the end bar.

In Fig. 6 I have shown a solid cast steel or malleable end member 2ˣ which may be substituted for the wrought steel end member shown in Fig. 4, and this solid member if constructed of malleable iron or of cast steel does not require any truss-rods, and the cheek-brackets can be made integral therewith. It might not be necessary to have the end members provided with drops 2ᵃ if a motor was used or designed which would not require such drops in the end members. With such motors the modified forms of end members shown in Figs. 15 and 16 might be used. Fig. 15 shows a straight cast end member 2ʸ, and Fig. 16 shows an end member composed of an upper flat bar 2ᵖ attached at its ends to the castings 1ᵈ and provided with truss-rods 2ᑫ and struts 2ʳ. This bar 2ᵖ may be dropped, as shown, so as to lower the springs relatively to the side bars of the frame. In these modifications one king bolt could be used, as shown, instead of two to fasten the car body B to the truck. Both of the forms of end members shown in Figs. 15 and 16, can be used in single trucks with electric motors.

Figure 13:
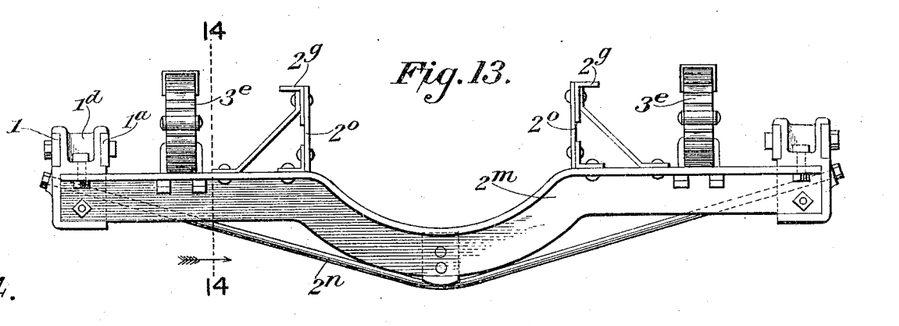
Fig. 13 is an end view of the truck with a modified form of end bar.
Figure 14:
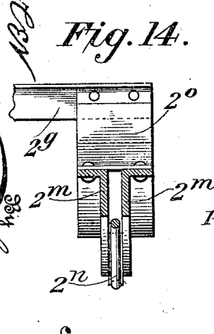
Fig. 14 is a section on line 14—14, Fig. 13.

Fig. 13 shows another modification of the end member, in which in place of a flat bar 2 (Fig. 4) I use a pair of angle bars 2ᵐ dropped in the center and supported by a single truss-rod 2ⁿ, and in place of cast cheek-brackets 2ᶠ, composite brackets 2ᵒ are shown carrying the angle-beams 2ᵍ.

Figures 17, 18, 19:
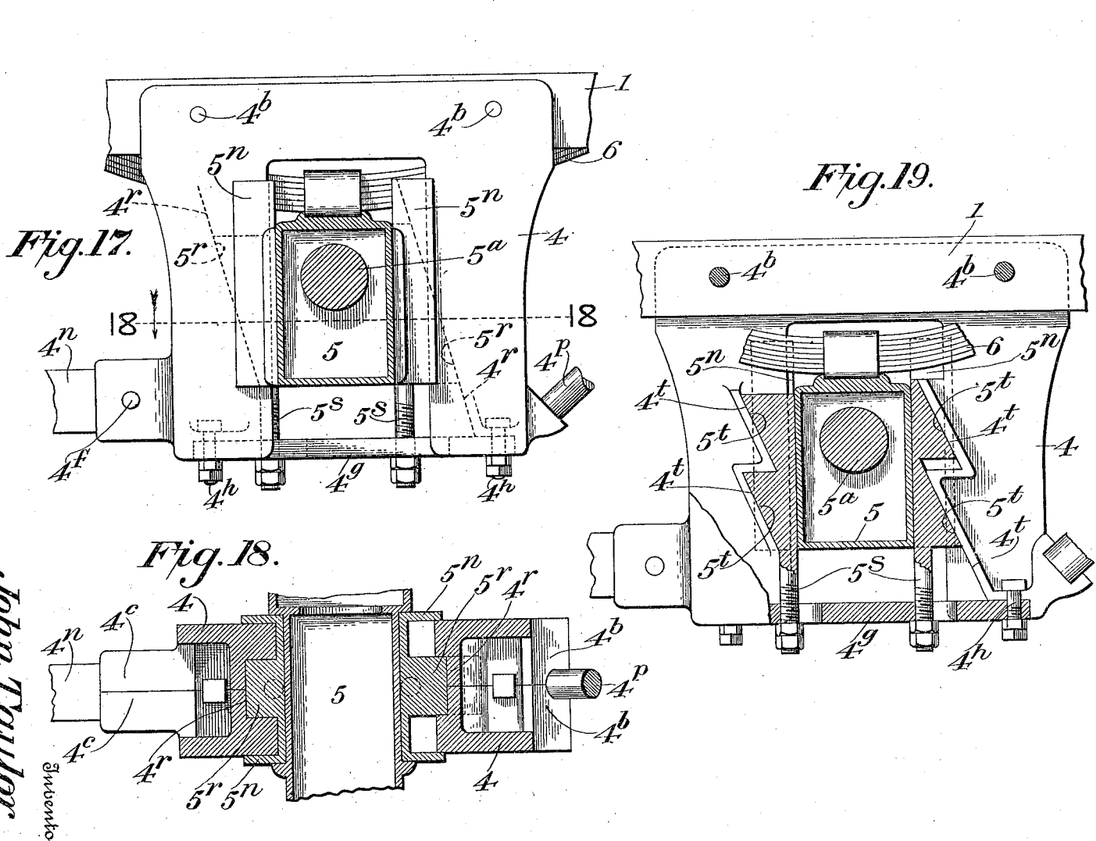
Fig. 17 is a detail side view of a pedestal partly in section showing wedges for laterally adjusting the journal box.
Fig. 18 is a transverse horizontal section on line 18—18, Fig. 17.
Fig. 19 is a sectional elevation of another form of wedge devices for laterally adjusting the journal box.

Instead of making the axle-journal and bearing plates laterally adjustable in the journal boxes 4 as in Figs. 8 and 10, the entire journal box may be made laterally adjustable in the pedestal, for the purpose of taking up slack in or adjusting the driving chains. As indicated in Figs. 17 and 18 the journal-box 5 is guided between vertically adjustable plates 5ⁿ, which are placed between the sides of the box and the legs of the pedestal, and are provided with wedge surfaces 5ʳ on their outer faces adapted to engage oppositely inclined wedge surfaces 4ʳ on the inner faces of the legs of the pedestals, as shown. The plates 5ⁿ can be vertically adjusted by any suitable means; tap-bolts 5ˢ being shown in the drawings for this purpose. By similarly raising or lowering the wedge plates 5ⁿ the box 5 can be shifted laterally in the pedestal to take up slack in the driving chains or belts. Instead of a single wedge-face as shown in Fig. 17, the plates 5ⁿ might be provided with double wedge-faces 5ᵗ, see Fig. 19, engaging double wedge-faces 4ᵗ on the legs of the pedestal 4; these double wedges allow more lateral adjustment to the box for a given height of the pedestal. I however prefer the adjusting devices shown in Figs. 8 to 10.

Figure 2:
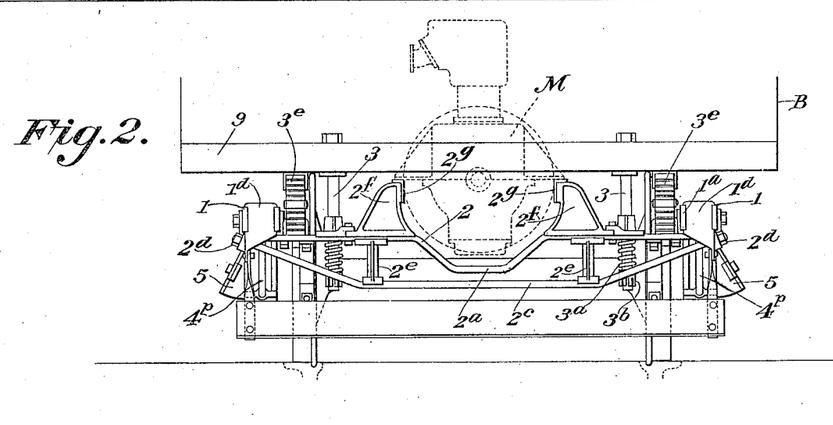
Fig. 2 is an end view of Fig. 1.

The preferred form of truck is shown in Figs. 1 to 3 and has been very successfully used for gasolene and alcohol motor trucks and possesses the following practical advantages: (1) The body supporting springs 3ᵉ being located on the extreme end members of the truck, in combination with the heavy half elliptic springs 6 supporting the truck-frame upon the journal boxes effectually prevent teetering or galloping of the car body. (2) The engine being mounted rigidly upon the frame and between two long angle bars solidly supported on the end members of the truck-frame is carried entirely by the truck-frame, while the car body is left free to move up and down on the body springs 3ᵉ. (3) The engine not being attached to or supported in any way by the car body rides, with the frame, on the four half elliptic springs 6 which are placed over the journal boxes. (4) The heavy spring shackles are very strong, limit the wear to the minimum, are very easily and quickly attached, and inexpensive to manufacture, and afford a very easy flexible connection between the supporting springs 6 and the truck-frame. (5) By means of the adjusting bolts on each side of the journal box (Figs. 8–10) I am able to move or adjust the bearing plate and axle in the boxes, and take up any slack in the sprocket chains or driving belts transmitting power from the motor shaft to the axles, and in this construction none of the moving parts of the adjusting devices are exposed to grit and dust, all being incased within the journal boxes; or by means of the wedge devices shown in Figs. 17 to 19 I can take up the slack in the sprocket chains, and use common axle journal bearings. (6) The jaws or pedestals being made in two halves bolted together to form a complete jaw, are each provided with four wearing strips or faces 4ʲ, two for each side of the journal-box. The bosses on each side of the journal-box, which receives the adjusting bolts, can move freely up and down in the pedestals, under the action of the half elliptic springs 6, and have ample room for easy spring action; and with such jaws and frame the adjusting bolts can be easily operated by a wrench, without taking down any part of the truck, to adjust or shift the journal brasses in the journal boxes and move the axles laterally to take up slack or wear in the sprocket chains.

The truck is adapted for use with any suitable or preferred form of explosive engine or motor; and on account of the large open space between the end bars of the truck and the sprocket driving chains can be arranged to drive the truck from the center of the axles if desired; or two chains could be used on each axle instead of one as might be desirable for very heavy cars, or cars used on very steep grades; or where the motor truck is intended to be used as a locomotive. The feature of adjusting the bearings to take up the slack and wear of the sprocket driving chains is very important in a motor driven truck of this type, as no matter how closely the driving chains are adjusted at the outset, they are bound to stretch somewhat under strains of use and wear, and it is practically essential that means be provided for compensating for this elongation of the drive chains in order to prevent unnecessary and dangerous shocks and jars in starting and stopping the truck.

Having described my invention what I claim as new and desire to secure by Letters Patent thereon is:

1. A motor truck frame comprising side members, end members rigidly connected to the side members, cheek-brackets on said end members and parallel motor supporting bars extending longitudinally of the frame and supported upon said cheek brackets.

2. A motor truck frame comprising side members, end members rigidly connected to the side members and having central depressions or drops intermediate the side members, and parallel motor supporting bars extending longitudinally of the truck and supported upon said end members at opposite sides of the depressions.

3. A motor truck frame comprising side members, end members rigidly connected to the side members and having central depressions or drops intermediate the side members, cheek brackets on said end members, and parallel motor supporting bars extending longitudinally of the truck and supported upon said cheek brackets.

4. In a truck the combination of side members, composed of parallel metal bars, pedestals attached to the side members, stay-bars between the adjacent pedestals, braces between the outer legs of the pedestals and the ends of the side members, end members connecting the side members, and parallel motor supporting bars extending longitudinally of the truck and supported on the end members.

5. In a truck for explosive motors, the combination of side members, castings on the end of the side members, end members rigidly connected to said castings, and parallel motor supporting bars extending longitudinally of the truck and rigidly mounted on the end members.

6. In a truck for explosive motors the combination of side members, end members rigidly connected to the ends of the side members and having central depressions for accommodation of the motor, and means for supporting a motor on the end members.

7. A truck frame for a motor comprising metal side members, and end members rigidly connected to the side members; cheek brackets on said end members and parallel angle bars extending longitudinally of the truck and supported upon said cheek brackets.

8. In a motor truck the combination of side members, end members rigidly connected to the side members, said end members having depressions or drops in their upper sides between the side members, and parallel motor supporting bars extending longitudinally of the truck and mounted on the end members.

9. In a truck for explosive motors, the combination of side members, end members rigidly connected to the ends of the side members, said end members having central depressions or drops in their upper sides, cheek brackets on said end members, and parallel angle bars extending longitudinally of the truck and mounted on the cheek brackets.

10. In a truck for explosive motors the combination of side members composed of parallel metal bars, pedestals attached to said members, stay-bars intermediate the pedestals, and braces between the outer legs of the pedestals and ends of the side members; with end members rigidly connected to the side members, and parallel motor supporting bars extending longitudinally of the truck and rigidly mounted on the end members.

11. In a motor truck, the combination of side members composed of parallel metal bars, pedestals attached to said members, stay bars intermediate the pedestals, and braces between the pedestals and ends of the side members; with end members rigidly connected to the side members and having central depressions in their upper sides and motor supporting bars rigidly mounted on the end members.

12. In a truck for explosive motors, the combination of side members composed of parallel metal bars, castings attached to the ends of the side members, pedestals attached to said members, stay bars intermediate the pedestals, and braces between the pedestals and end castings on the side members; with end members rigidly connected to said end castings, and parallel motor supporting bars rigidly mounted on the end members.

13. A truck for explosive motors, comprising side members composed of parallel metal bars, pedestals attached to said members, stay bars intermediate the pedestals, and braces between the pedestals and ends of the side members; with end members rigidly connected to the side members and having central depressions in their upper sides, cheek brackets on said end members, and parallel motor supporting bars extending longitudinally of the truck and mounted on the end members.

14. In a motor truck, the combination of side members, end members and parallel motor supporting bars extending longitudinally of the truck and supporting the truck upon the end members; with a pair of king bolts engaging each end member intermediate the said bars and the side members.

15. In a truck, the combination of side members, end members having central depressions, parallel motor supporting bars extending longitudinally of the truck and supporting the truck upon the end members, and a pair of king bolts engaging each end member at opposite sides of the depression therein.

16. In a truck for explosive motors, the combination of side members, end members rigidly connected to the side members, cheek brackets on said end members, bars extending longitudinally of the truck and rigidly mounted on the cheek brackets, and a pair of king bolts engaging each end member beside the cheek brackets.

17. In a truck the combination of side members, end members having central depressions, cheek brackets on the end members beside the depressions, parallel motor supporting bars extending longitudinally of the truck and supported upon the cheek brackets, and a pair of king bolts engaging each end member adjacent the cheek brackets.

18. In a truck, the combination of side members, composed of parallel metal bars, pedestals attached to the side members, stay bars between the adjacent pedestals, braces between the outer legs of the pedestals and the ends of the side members, end members connecting the side members, parallel motor supporting bars extending longitudinally of the truck and supported upon the end members, and a pair of king bolts engaging each end member intermediate the bars and the side members.

19. In a truck, the combination of side members, end members, and parallel bars extending longitudinally of the truck and supported upon the end members; with a motor supported on said bars, axles carrying said frame, chains for driving the axles from the motor shaft, and means for adjusting the axles laterally to take up slack in the chains.

20. In a truck, the combination of side members, end members, parallel bars extending longitudinally of the truck and supporting the truck upon the end members, and a motor rigidly supported between said bars; with carrying axles, journal boxes on said axles, springs supporting the frame on said journal boxes, chains for driving the axles from the motor shaft, and means for adjusting the axles laterally to take up slack in the chains.

21. In combination, a metallic frame having side members provided with pedestals, end members, parallel bars extending lengthwise of the truck and rigidly mounted on said end members, boxes in said pedestals, axles journaled in said boxes, springs suspending the frame on said boxes, a motor fixedly supported on said bars, chains for driving the axles from the motor shaft, and means for adjusting the axles laterally in the pedestals to take up slack in the chains.

22. In combination, a metallic frame having side members provided with pedestals, end members having central depressions in their upper sides, parallel bars extending lengthwise of the truck and mounted on said end members, journal boxes in said pedestals, axles journaled in said boxes, a motor fixedly supported on said bars, chains for driving the axles from the motor shaft, and means for adjusting the axles laterally to take up slack in the chains.

23. In combination, a metallic frame having side members provided with pedestals, end members having central depressions in their upper sides, cheek brackets at opposite sides of said depressions, parallel bars extending lengthwise of the truck and mounted on said cheek brackets, boxes in said pedestals, axles journaled in said boxes, springs suspending the frame on said boxes, a motor supported on said bars, chains for driving the axles from the motor shaft, and means for adjusting the axles laterally to take up slack in the chains.

24. In a motor truck, the combination of axles, journal boxes, a truck frame having side and end members, pedestals on the side members, parallel bars extending lengthwise of the truck and rigidly mounted on said end members, boxes in said pedestals, axles journaled in said boxes, springs suspending the frame on said journal boxes, a motor supported on said bars, chains for driving the axles from the motor shaft, and means for adjusting the axles laterally in the pedestals to take up slack in the chains.

25. In a motor truck, the combination of a metallic frame having side and end members, pedestals on the side members, journal boxes in said pedestals, semi-elliptic springs supporting the frame on said boxes, car-body supporting springs on the end members adjacent the side members, and king bolts adjacent the springs for attaching the car-body to the end members; with parallel bars extending lengthwise of the truck and rigidly mounted on said end members, axles journaled in said boxes, a motor fixedly supported on said bars, chains for driving the axles from the motor shaft, and means for adjusting the axles laterally to take up slack in the chains.

26. In a motor truck, the combination of axles, journal boxes, a metallic truck frame having side and end members, pedestals on the side members in which the journal boxes are secured, semi-elliptic springs supporting the frame on said boxes, a motor rigidly mounted on said frame, chains for transmitting motion from the motor shaft to the axles, and means for adjusting the axles laterally to take up slack in said chains, car-body supporting springs on the end members adjacent to the side members, and king bolts adjacent the springs for attaching the car-body to the end members.

27. An end member for trucks comprising a top bar having a central depression, truss-rods underlying said bar, and struts interposed between said bar and truss-rods.

28. An end member for trucks comprising a top bar having a central depression, and cheek brackets on the bar at opposite sides of the depression, truss-rods underlying said bar, and struts interposed between said bar and truss-rods.

29. In a motor truck, the combination of the truck frame, axle journal boxes, the axles, a motor mounted on said frame, and chains for driving the axles from said motor; with means for laterally shifting the axles in the journal boxes to take up slack in the chains.

30. In a motor truck the combination of a truck frame provided with pedestals, axle journal boxes in said pedestals, axles journaled in said boxes, a motor mounted on said frame, chains for driving the axles from said motor, and means for laterally shifting the axles in the boxes to take up slack in the chains.

31. In combination, a truck frame, a motor rigidly mounted on said frame, journal boxes, axles, chains for driving the axles from the motor shaft, and means for independently adjusting the axles laterally in the journal boxes to take up slack in the chains.

32. In combination, a truck frame provided with pedestals, journal boxes in said pedestals, springs supporting said frame on said journal boxes, axles journaled in said boxes, a motor rigidly mounted on said frame, chains for driving the axles from the motor shaft, and means for adjusting the axles laterally in said journal boxes to take up slack in the chains.

33. In combination with a truck frame, a pedestal composed of two opposite similar complemental parts separable lengthwise of the truck each having leg portions adapted to embrace a journal box, and having their upper portions bolted to the side members of the frame and their lower portions abutting and securely bolted together, substantially as described.

34. In a car truck the combination of side members, an end member having a central depression on its upper side intermediate its ends for the accommodation of a motor, cheek brackets on the end member at opposite sides of said depression, and motor supporting bars connected to said cheek brackets.

35. In a motor truck, the combination of a truck frame, end bars having central depressions, and straight parallel motor supporting bars extending longitudinally of the frame and supported upon the end bars at opposite sides of the depressions.

36. In a motor truck, the combination of side members, end members, cheek brackets on said end members, and straight parallel motor supporting bars extending longitudinally of the truck and lying above the end members and axles, and supported upon the cheek brackets.

37. In combination, a journal box, a truck frame, a semi-elliptic spring supporting the frame on the journal box, and shackles formed of strap metal each having a hooked upper end embracing an eye of the spring and adapted to be engaged therewith or disengaged therefrom by slipping the hook laterally over the eye, said hooks being pivotally connected at their lower ends to the frame.

In testimony that I claim the foregoing as my own, I affix my signature in presence of two witnesses.

JOHN TAYLOR.

Witnesses:
  FRANK SHRANDER,
  HERBERT D. RANKIN.